July 22, 1952
A. A. OBERMAIER
2,604,528
PHOTOELECTRIC MEASUREMENT TRANSLATING MEANS
Filed Oct. 28, 1947
2 SHEETS—SHEET 1
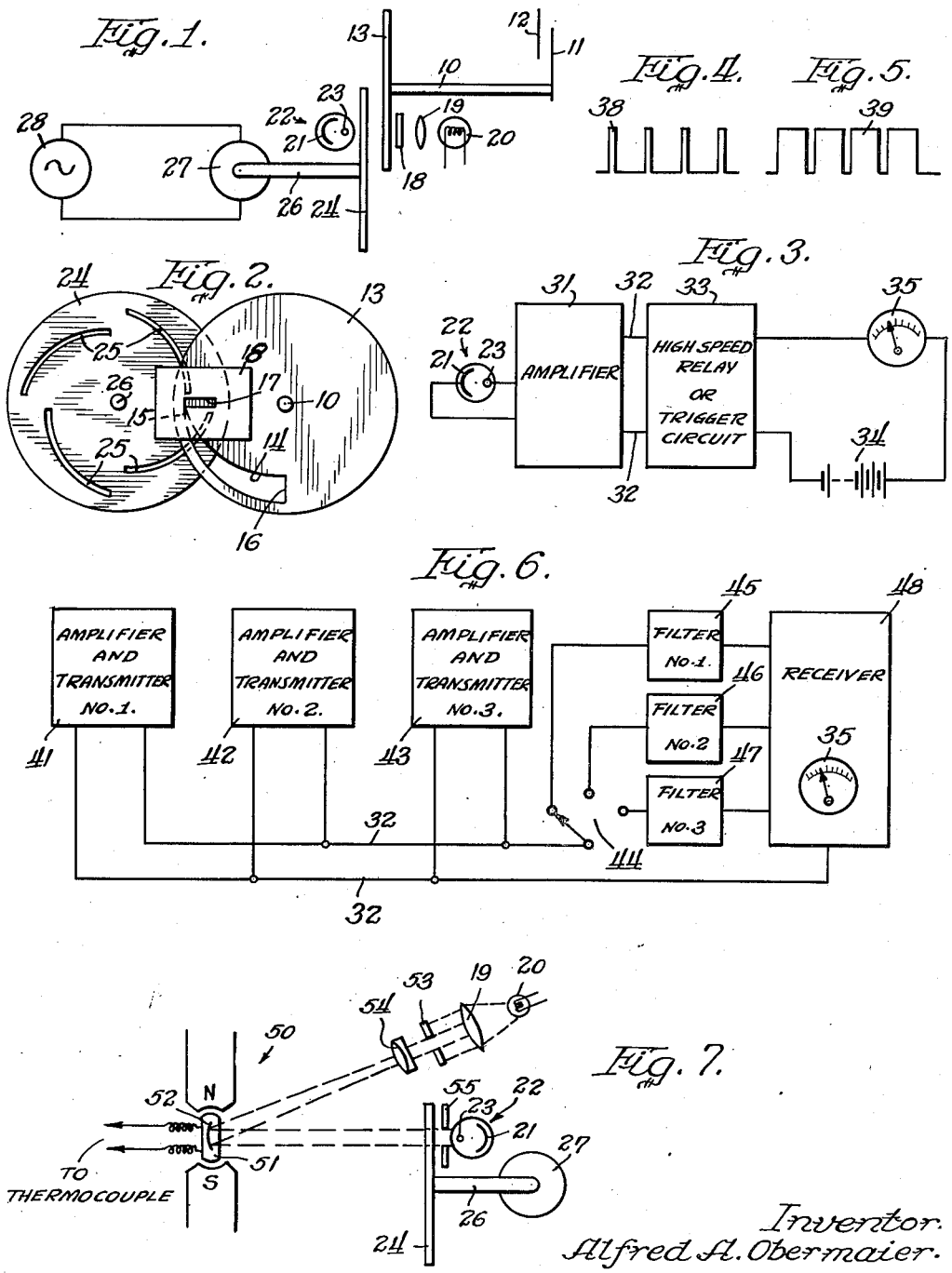
Inventor.
Alfred A. Obermaier.
By Brown, Jackson, Boettcher & Dienner
Attys.

July 22, 1952     A. A. OBERMAIER     2,604,528
PHOTOELECTRIC MEASUREMENT TRANSLATING MEANS
Filed Oct. 28, 1947     2 SHEETS—SHEET 2
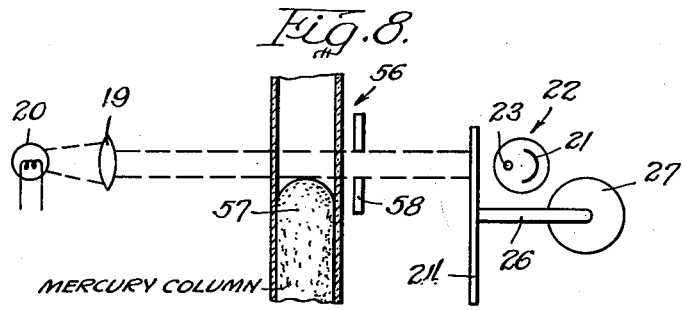
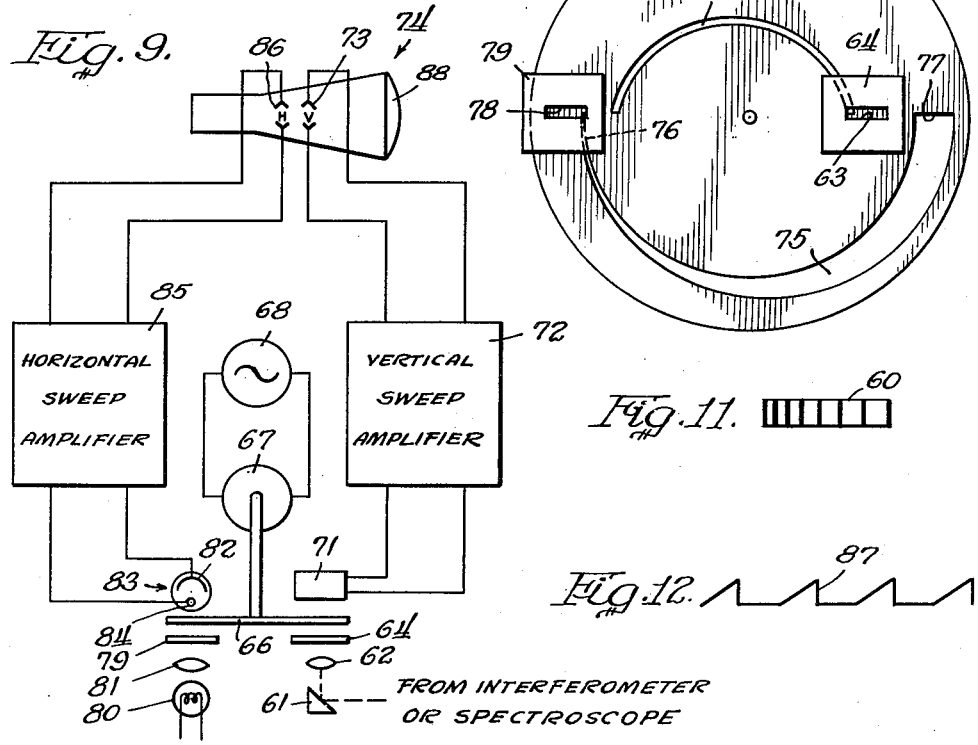
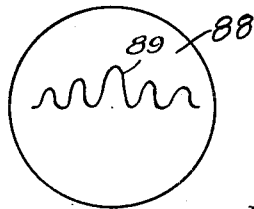
Inventor:
Alfred A. Obermaier.
By Brown, Jackson, Boettcher & Dienner
Att'ys Patented July 22, 1952

2,604,528

UNITED STATES PATENT OFFICE 2,604,528

PHOTOELECTRIC MEASUREMENT TRANSLATING MEANS

Alfred A. Obermaier, Chicago, Ill., assignor to Illinois Testing Laboratories, Inc., Chicago, Ill., a corporation of Illinois Application October 28, 1947, Serial No. 782,504

2 Claims. (Cl. 177—351)

My invention relates, generally, to measurement translating means and it has particular relation to such means employing photoelectric means for effecting the desired translation.

Among the objects of my invention are: To translate the measurement of a varying quantity from a device accomplishing the same without placing any additional load on the device; to translate the measurement into a square wave of current of constant frequency with the breadth of the waves being a function of the quantity being measured; to integrate the energy of the square waves of current and thereby provide an indication of the quantity being measured or of the measurement made by the device; to translate a variable density phenomenon into a variable amplitude pattern for assisting in interpreting the former; and to apply to one set of deflecting plates of a cathode ray tube impulses which are a function of the light from an area of variable light intensity and to another set of its deflecting plates impulses of the same frequency but of continuously varying magnitude for producing a pattern on the screen of the cathode ray tube which corresponds to the light intensity over said area.

Other objects of my invention will, in part, be obvious and in part appear hereinafter.

My invention is disclosed in the embodiments thereof as shown in the accompanying drawings and it comprises the features of construction, combination of elements and arrangement of parts which will be exemplified in the constructions hereinafter set forth and the scope of the application of which will be indicated in the appended claims.

For a more complete understanding of the nature and scope of my invention reference can be had to the following detailed description, taken together with the accompanying drawings, in which:

Figure 1 illustrates, diagrammatically, the apparatus which can be employed for translating a measurement of a varying quantity from a device responsive to the same to another measurement indicating device;

Figure 2 is a view, in front elevation, of the discs and masking plate employed in the construction illustrated in Figure 1;

Figure 3 illustrates, diagrammatically, certain of the circuits that can be employed for interconnecting the light sensitive device or photocell shown in Figure 1 and a remotely located indicating instrument;

Figures 4 and 5 show square waves of the same frequency having different breadths corresponding to different light intensities impinging on the photocell;

Figure 6 illustrates, diagrammatically, how several indications can be transmitted simultaneously over a single communication channel using the apparatus shown in Figures 1, 2 and 3;

Figure 7 illustrates a modification of the system shown in Figure 1 for use in conjunction with low impedance measuring circuits such as a thermocouple;

Figure 8 illustrates how my invention can be employed for measuring changes in the height of a column of mercury in a manometer tube;

Figure 9 illustrates, diagrammatically, the apparatus that may be employed for scanning an area of variable light intensity for reproducing the same on the screen of a cathode ray tube;

Figure 10 is a view, in front elevation, of the disc and masking plates employed in the system shown in Figure 9;

Figure 11 shows a typical image of the interference fringes from an interferometer or spectroscope or the area of variable light intensity which is to be reproduced on the screen of the cathode ray tube;

Figure 12 illustrates the wave form that is produced on the screen of the cathode ray tube by the variable width slot in the disc shown in Figure 10; and Figure 13 illustrates a typical pattern shown on the screen of the cathode ray tube corresponding to the area of variable light intensity shown in Figure 11.

Referring now particularly to Figure 1 of the drawings, it will be observed that reference character 10 designates the shaft of a measuring instrument, such as an ammeter, volt meter, watt meter or like measuring instrument, having a pointer 11 which is movable relative to the scale 12. It may be assumed that the shaft 10 is rotated by a suitable mechanism through an extent which is a function of the quantity, i. e., amperes, volts, watts, etc., being measured. The pointer 11 and scale 12 are shown in order to demonstrate more clearly one particular application of this invention. It will be understood, however, that they may be omitted and that the shaft 10 may be rocked in response to other varying quantities such as steam pressures, speed, acceleration, etc. In accordance with this invention provision is made for translating the measurement provided by the movement of the shaft 10 to a remote position without applying any additional load to the shaft 10.

Mounted on the shaft 10 for movement therewith is a disc 13 which, as shown in Figure 2, has an arcuate slot 14 therein of varying width. It will be noted that the slot 14 varies from a minimum width at one end 15 to a maximum width at the other end 16. It will be understood that the disc 13 is intended to rock only through 90° on corresponding movement of the shaft 10 from the zero position to the position corresponding to the maximum value of the quantity being measured. If the shaft 10 rocks through a shorter or longer arc to provide full scale deflection, the slot 14 is correspondingly shortened or lengthened as will be understood.

The arcuate slot 14 in the disc 13 registers with a rectangular slot 17 in a stationary masking plate 18 through which light rays concentrated by a suitable lens 19 from a light source 20 pass. The rectangular slot 17 provides a light beam having a generally rectangular cross section of uniform intensity, portions of which are permitted by the arcuate slot 14 to impinge on a cathode 21 of a light sensitive device or photocell 22 having an anode 23. It will be understood that the amount of light received by the photocell 22 will depend upon the extent that the variable width slot 14 uncovers the rectangular slot 17 in the masking plate 18. Thus the quantity of light impinging on the cathode 21 is a function of the quantity being measured as determined by the displacement of the shaft 10 from the zero or initial position.

It is possible to measure the variation in light impinging on the cathode 21 of the photocell 22 and thereby to obtain an indication corresponding to the indication provided by the position of the shaft 10. However, such a system is subject to certain disadvantages which may render it ineffective and inaccurate. Certain of the sources of trouble with such a system reside in variations in the intensity of the light rays emitted by the light source 20. Since the measurement provided by the apparatus thus far described is a function of the light intensity, it is essential that the light emitted by the source 20 be constant so that variations in the amount of ligh impinging on the cathode 21 will result solely from variation in the quantity being measured. Other difficulties lie in the fatigue of the photocell 22 and variations in the calibration of the amplifying means that is used in connection therewith.

With a view to overcoming the foregoing disadvantages in a system which depends solely for its accuracy on maintaining the foregoing factors constant, provision is made for converting the light rays impinging on the cathode 21 into a series of impulses of fixed frequency and varying width. For this purpose a scanning disc 24 is provided having arcuate scanning slots 25 of uniform width, these slots being arranged, as shown, to scan the light beam transmitted through the rectangular slot 17 in the masking plate 18 and so much of the same as passes through the arcuate slot 14 in the disc 13. While four scanning slots 25 are illustrated in the disc 24 it will be understood that a larger or smaller number can be employed as desired.

The scanning disc 24 is mounted for rotation on a shaft 26 that may be driven by any suitable means operating at a constant speed such as a motor 27 of the synchronous type that may be energized from a suitable source 28 of alternating current such as a 60 cycle 110 volt source. Where the motor 27 is designed to rotate at a speed of 450 R. P. M. and four scanning slots 25 are employed, the light beam directed through the rectangular slot 17 and the arcuate slot 14 is scanned 30 times each second. Current impulses at this frequency flow through the photocell 22 and, as shown in Figure 3, may be amplified by a suitable amplifier 31 and applied to a circuit indicated by the conductors 32. The amplifier 31 may be of any suitable type, such as an electronic amplifier the details of construction of which are well known to those skilled in the art. The circuit represented by the conductors 32 may be relatively long in order to transmit the measurement of the quantity as provided by the movement of the shaft 10 to a remote point.

As shown in Figure 3 the conductors 32 are arranged to energize a high speed relay or a trigger circuit employing electronic tubes as indicated at 33. The high speed relay or trigger circuit 33 may be connected to apply intermittently the voltage from a constant voltage direct current source, such as a battery 34, to energize a meter 35, such as a ballistic indicator, for integrating the impulses thus applied.

When the disc 13 occupies a position such that the narrow end 15 of the slot 14 registers with the slot 17, the current impulses through the photocell 22 are in the form of rectangular waves 38 as shown in Figure 4. It will be noted that the breadth of these waves is relatively narrow, i. e., the time that the current is flowing is relatively small as compared to the time that it does not flow. When the arcuate slot 14 is shifted so that the other end 16 uncovers the major portion of the rectangular slot 17, the current impulses flowing through the photocell 22 are as represented by the square wave 39 shown in Figure 5. In this case the breadth of each of the impulses is relatively great or the time that each impulse flows is relatively long as compared to the time that no current flows. The high speed relay or trigger circuit 33 follows the wave forms 38 or 39 or any intermediate wave form and effects corresponding energization of the meter 35. Since this meter is of the integrating ballistic type, its pointer assumes a position which corresponds to the sum of the areas of each of the individual square topped waves. It follows, therefore, that the position of the pointer of the meter 35, when the system is properly calibrated, corresponds to the position of the shaft 10.

It is possible to transmit simultaneously several different indications over the signalling channel or circuit 32. This can be accomplished by several transmitters, as shown in Figure 6, which are duplicates of the transmitter shown in Figure 1 with the amplifier 31 of Figure 3. In each transmitter the scanning disc 24 is either rotated at a different speed or a different number of slots 25 or both are used to provide different frequencies the breadth of each wave of which is controlled as described as a function of the quantity being measured. Such transmitters are indicated at 41, 42 and 43 in Figure 6.

A selector switch 44 may be used to switch the circuit 32 to the appropriate filter 45, 46 or 47 for effecting corresponding operation of a receiver 48 which includes essentially the relay or trigger circuit 33 of Figure 3 and the integrating meter 35. Of course it will be understood that the frequencies used are so chosen as to avoid interference due to harmonics. Also, instead of the communication circuit 32 being of a conductive character, it may be of the radio or carrier current type as desired.

As shown in Figure 7, in lieu of the disc 13 operated by shaft 10 of a measuring instrument, the sensitive galvanometer 50 may be employed having a moving coil 51 that may be energized from a low impedance circuit, such as a thermocouple, and may carry a mirror 52. The mirror 52 has light rays focused thereon by condenser lens 19 from a source 20. A slit in a masking plate 53 serves to provide an image that is reflected by the mirror 52, after the beam passes through the objective lens 54, through the scanning slots in the scanning disc 24 onto the cathode 21 of the photocell 22. A masking plate 55 with a suitable opening therein serves to prevent extraneous light from impinging on the cathode 21.

In Figure 8 there is illustrated a manometer tube 56 in which there is located a mercury column 57. The position of the top of the column 57 varies the width of the light beam from the source 20 impinging on the cathode 21 of the photocell 22. A masking plate 58 has an aperture which defines the maximum width of the light beam from the source 20. The disc 24, rotated as described, scans the light beam thus provided for the purpose described.

My invention also can be employed for translating a variable density phenomenon to a variable amplitude pattern on the screen of a cathode ray tube for convenience in interpretation. In accordance with my invention it is possible to do this and to provide a pattern which follows closely the changes in the area of variable light intensity. Such an area is shown at 60 in Figure 11 for illustrative purposes and may be provided by an interferometer or a spectroscope.

As illustrated in Figure 9 the light from such an area can be reflected by a prism 61 through a suitable lens which is indicated, diagrammatically, at 62. The light rays are transmitted through a slot 63, Figure 10, in a masking plate 64, the slot 63 being arranged to be scanned by an arcuate scanning slot 65 in a disc 66. The disc 66 can be rotated by any suitable means such as synchronous motor 67 that may be driven from a suitable source 68 of alternating current. The source 68 may be a conventional 60 cycle 110 volt source and the motor 67 can be arranged to drive the disc 66 at any suitable speed such as a speed of 450 R. P. M.

The scanned light beam impinges on a multiplier phototube 71 whose output is amplified by a vertical sweep amplifier 72 and then applied to the vertical deflection plates 73 of a cathode ray tube which is indicated, generally, at 74.

With a view to extending the pattern horizontally the disc 66 is provided with an arcuate slot 75 of varying width. It will be noted that the slot 75 extends from the end 76 of minimum width to the end 77 of maximum width and that it extends through 180°. When the disc 66 is rotated, the slot 75 moves relative to a slot 78, Figure 10, in a masking plate 79 for the purpose of controlling the amount of light which is emitted from a light source 80 and directed by a suitable lens 81 to the slot 78. The light which passes through the slot 75 falls on a cathode 82 of a photocell, shown generally at 83, which has an anode 84. The output of the photocell 83 may be amplified by a horizontal sweep amplifier 85 and thereby applied to the horizontal deflection plates 86 of the cathode ray tube 74.

The horizontal pattern provided solely by the horizontal deflection plates 86 when they are energized as described is illustrated at 87 in Figure 12. This saw tooth pattern 87 appears horizontally across the screen 88 of the cathode ray tube 74. When light from the area of variable light intensity, such as illustrated at 60 in Figure 11, impinges on the multiplier phototube 71 as controlled by the scanning slot 65, and the horizontal deflection plates 86 are energized as described, the pattern as illustrated at 89, Figure 13, appears on the screen 88. The pattern 89 which appears on the screen 88 can be interpreted much more readily than can the area of variable light intensity 60 provided as described.

Since certain changes can be made in the foregoing constructions and systems and different embodiments of the invention can be made without departing from the spirit and scope thereof, it is intended that all matter shown in the accompanying drawings and described hereinbefore shall be interpreted as illustrative and not in a limiting sense.

I claim as my invention:

1. Means for indicating the amount of angular movement of a first member having turning movement, which comprises, in combination, means for emitting a light beam, photoelectric means for receiving the light beam, a masking plate having a rectangular slot traversed by the light beam, means connected to said first member to turn in accordance with the turning movement of said first member and having an opening of a character to change the quantity of light transmitted through said rectangular opening and impinging on said photoelectric means as a function of the amount of turning movement of said first member, scanning means rotatable in a path intersecting that portion of the light beam which traverses said rectangular opening and the opening of a character to change the quantity of the light transmitted through said rectangular opening, whereby the photoelectric means is energized at a frequency determined by the speed of rotation of said scanning means and in amount determined by the quantity of light impinging thereon, the scanning means being in the form of a disc rotatable in the path of the light and provided with a plurality of arcuate scanning slots of uniform width, and indicating means connected to said photoelectric means to integrate the current impulses through said photoelectric means whereby to indicate the amount of turning movement of said first member.

2. Means for indicating the amount of angular movement of a first member having turning movement, which comprises, in combination, means for emitting a light beam, photoelectric means for receiving the light beam, a masking plate having a rectangular slot traversed by the light beam, means connected to said first member to turn in accordance with the turning movement of said first member and having an opening of a character to change the quantity of light transmitted through said rectangular opening and impinging on said photoelectric means as a function of the amount of turning movement of said first member, scanning means rotatable in a path intersecting that portion of the light beam which traverses said rectangular opening and the opening of a character to change the quantity of the light transmitted through said rectangular opening, whereby the photoelectric means is energized at a frequency determined by the speed of rotation of said scanning means and in amount determined by the quantity of light impinging thereon, the opening in the means connected to said first member to turn in accordance with the turning movement of said first member being of arcuate form of minimum width at zero position of turning movement of said first member and of progressively increasing width to maximum operative width at the maximum position of turning movement of said first member, the scanning means being in the form of a disc rotatable in the path of the light and provided with a plurality of arcuate scanning slots of uniform width, and indicating means connected to said photoelectric means to integrate the current impulses through said photoelectric means whereby to indicate the amount of turning movement of said first member.

ALFRED A. OBERMAIER.

REFERENCES CITED

The following references are of record in the file of this patent:

UNITED STATES PATENTS

| Number | Name | Date |
|---|---|---|
| 1,672,671 | Young | June 5, 1928 |
| 1,750,242 | Ostrolenk | Mar. 11, 1930 |
| 2,133,241 | Baker | Oct. 11, 1938 |
| 2,176,720 | Rayner | Oct. 17, 1939 |
| 2,208,147 | Eisler | July 16, 1940 |
| 2,252,083 | Luck | Aug. 12, 1941 |
| 2,431,591 | Snyder, Jr. | Nov. 25, 1947 |

FOREIGN PATENTS

| Number | Country | Date |
|---|---|---|
| 342,734 | Great Britain | Feb. 6, 1931 |